United States Patent [19]

Wayman et al.

[11] 4,453,425

[45] Jun. 12, 1984

[54] HOLDING MECHANISM

[75] Inventors: William G. Wayman, New Barnet; Harald Engelbert, London, both of England

[73] Assignee: Crosfield Electronics Limited, London, England

[21] Appl. No.: 362,196

[22] Filed: Mar. 26, 1982

Related U.S. Application Data

[63] Continuation of Ser. No. 129,954, Mar. 13, 1980, abandoned.

[30] Foreign Application Priority Data

Mar. 22, 1979 [GB] United Kingdom ............... 7910080

[51] Int. Cl.³ .................. G05G 17/00; G05G 1/04; F16H 21/44
[52] U.S. Cl. ...................... 74/2; 74/100 R; 74/106; 74/107; 74/110; 74/520
[58] Field of Search ............... 74/2, 100 R, 106, 107, 74/110, 520

[56] References Cited

U.S. PATENT DOCUMENTS

| 972,689 | 10/1910 | Gillespie | 74/110 |
|---|---|---|---|
| 1,675,494 | 7/1928 | Jennings et al. | 74/520 |
| 1,799,229 | 4/1931 | Hanna | 74/110 |
| 2,440,366 | 4/1948 | Cropp | 74/520 X |
| 2,790,325 | 4/1957 | Bedker | 74/110 |
| 3,614,151 | 10/1971 | Shadle | 74/520 X |

Primary Examiner—Allan D. Herrmann
Attorney, Agent, or Firm—Sughrue, Mion, Zinn, Macpeak, and Seas

[57] ABSTRACT

A holding mechanism for holding a workpiece in position during an operation being performed by an operating device (7) passing along the workpiece includes a toggle linkage (1, 2, 3), a projecting member (9) attached to the device, and a cam track (2) connected to one part of the toggle linkage, the arrangement being such that, towards the end of the pass of the device, after it has completed its operation on the workpiece, the projecting member (9) engages the cam track (2), further movement of the device causes the projecting member (9) to move the middle pivot (3) of toggle linkage to release it and, hence, release the workpiece as the device completes its pass. Preferably the toggle linkage is arranged as an over-center toggle linkage with its other component formed by a telescopic arm (1).

10 Claims, 3 Drawing Figures

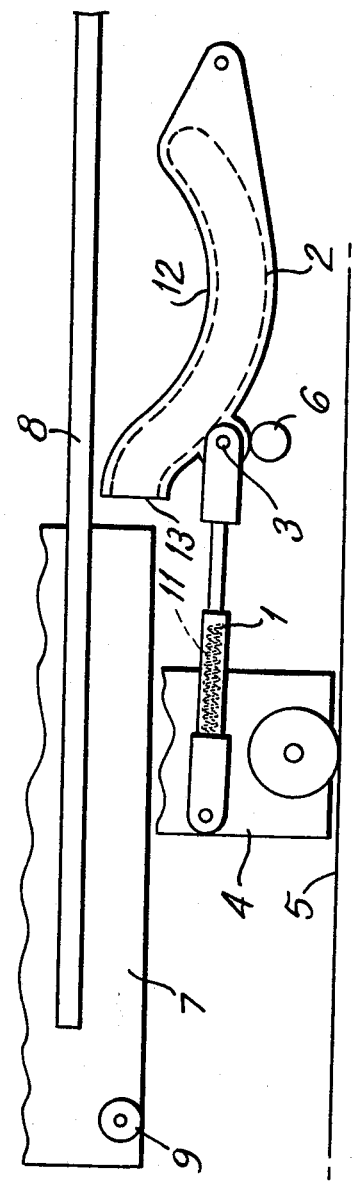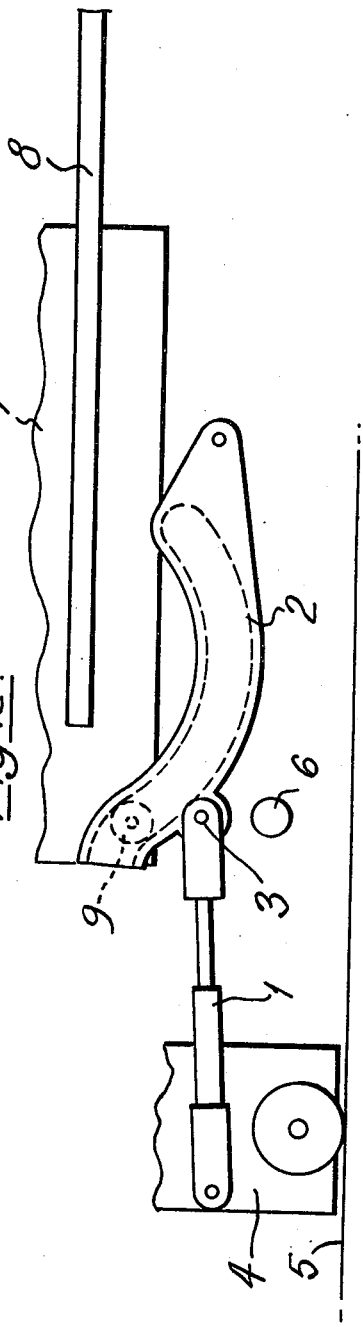

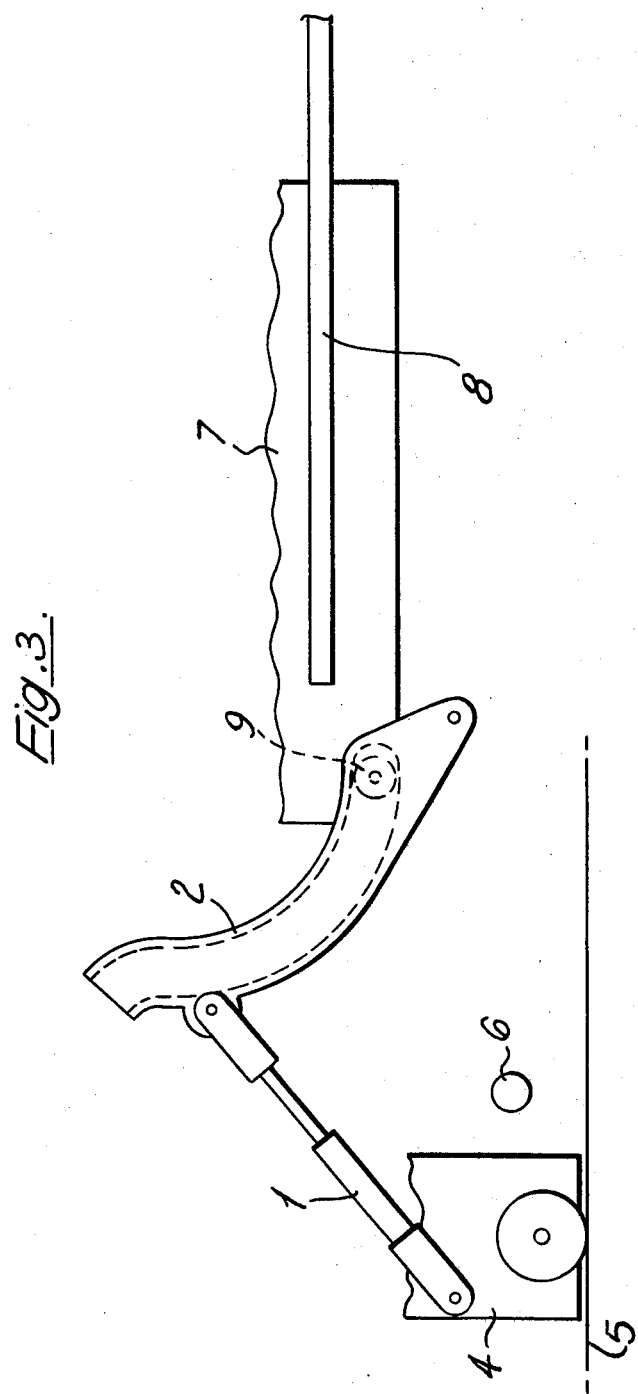

HOLDING MECHANISM

This is a continuation of application Ser. No. 129,954, filed Mar. 13, 1980, now abandoned.

BACKGROUND OF THE INVENTION

This invention relates to a holding mechanism for holding a workpiece while an operation is performed on it by an operating device which passes along the workpiece. The operation may be a passive one in which the operating device, in passing along the workpiece, scans the surface of the workpiece to determine the condition of the surface or, alternatively, the operating device may perform an active operation on the workpiece to modify its surface characteristics. An example of the former is an image scanner, where the image to be scanned, is placed on a cylinder which is then rotated about its axis while a scanning head moves axially along the cylinder. A scan of the image is obtained and this is recorded as the scanning head passes along the cylinder. An example of the second case is a center lathe where a workpiece is turned between center by a turning tool moving from one end of the workpiece to the other skimming the outside surface of the workpiece during its pass from one end to the other.

In cases such as these, once the operation has been performed on the workpiece, the clamp or other holding mechanism holding the workpiece in position is released to allow the workpiece to be removed and be replaced by a subsequent workpiece so that the operation can be repeated on the subsequent workpiece.

SUMMARY OF THE INVENTION

According to this invention a holding mechanism for holding a workpiece during an operation being performed by an operating device passing along the workpiece, includes a toggle linkage, a projecting member attached to the device, and a cam track connected to one part of the toggle linkage, the arrangement being such that, towards the end of the pass of the device, after it has completed its operation on the workpiece, the projecting member engages the cam track, further movement of the device causing the projecting member to move the middle pivot of the toggle linkage to release it and, hence, release the workpiece as the device completes its pass.

Preferably the toggle linkage is arranged as an over-center toggle linkage so that it is firmly held into its extended position to hold the workpiece tightly. Preferably the other component of the toggle linkage is formed by a telescopic arm spring biased into its extended position. In this way, the spring in the telescopic arm accommodates minor tolerances between different workpieces without damage to the toggle linkage or the workpiece and exerts a substantially constant holding force on the workpieces and provides the resilience to lock the toggle linkage into its over-center position.

The cam track connected to the one part of the toggle linkage may be formed by a slot in a cam plate attached to, or forming part of, the one part of the toggle linkage but preferably the cam track is in the form of a channel-shaped member which forms the one part of the toggle linkage. Preferably the cam track is serpentine shaped and formed by two arcs of different radius connected tangentially. Preferably the part of the cam track which the projecting member engages initially as it releases the toggle linkage has the smallest radius of curvature.

Preferably the operating device also includes a rail in front of the projecting member and parallel to the direction of movement of the device, the rail being arranged to lie in the path of the middle pivot of the toggle linkage when it is released. The rail therefore ensures that, at all times that the projecting member is not engaged in the cam track, it is impossible to release the toggle linkage holding the workpiece. In this way, any inadvertant release of the holding mechanism while the operating device is passing along the workpiece is prevented automatically.

A particular example of a holding mechanism in accordance with this invention which forms part of a support for a rotating cylinder of a scanner used in color separation for the preparation of printing members will now be described with reference to the accompanying drawings.

BRIEF DESCRIPTION OF THE DRAWINGS

FIG. 1 is a diagrammatic side elevation of the mechanism in its holding position;

FIG. 2 is a diagrammatic side elevation showing the mechanism as the toggle linkage is just being released; and, FIG. 3 is a diagrammatic side elevation of the holding mechanism after complete release.

DESCRIPTION OF THE PREFERRED EMBODIMENTS

The rotating cylinder of an image scanner used in color separation includes a pair of stub axles extending from its ends and these stub axles are journalled in a pair of journal bearings. One of the journal bearings is mounted on a slide and, to remove the cylinder, the journal bearing is moved axially along the slide to enable the stub axle to be released from the journal bearing and thereby enable the cylinder to be removed from the scanner and replaced by a different one. The construction of the image scanner is entirely conventional and this invention is concerned with the holding mechanism used for holding this journal bearing in position to support the cylinder during the scanning operation. The scanner also includes a scanning head arranged to move along the cylinder in the axial direction.

The holding mechanism for holding the journal bearing and, hence the cylinder, comprises a toggle linkage formed by a telescopic arm 1 and a cam track 2 which are pivotally connected together by a pivot 3 and are pivotally connected to a support 4 for the journal bearing and a fixed frame of the machine (not shown) respectively. The support 4 for the journal bearing is mounted on a slide 5 for movement in the axial direction of the cylinder. The telescopic arm 1 includes a spring 11, which biases the telescopic arm 1 into its extended position. The cam track 2 is generally U-shaped in cross-section and is serpentine shaped being formed by two substantially arcuate portions 12, 13 arranged tangentially downstream one from the other with the arcuate portion of the smallest radius being adjacent the telescopic arm 1.

When the cylinder is in its place in its journal bearing and the scanning head 7 is moving axially along the cylinder, the toggle linkage is in the position shown in FIG. 1, with the pivot 3 in the over-center position against a stop 6. A part of the scanning head 7 has a rail 8 attached to it. The rail 8 is parallel to the direction of movement of the scanning head and overlies the cam track 2. The rail 8 prevents the toggle linkage from being raised to release the journal bearing of the cylinder while the scanning device is scanning the cylinder.

The scanning device 7 also includes a projecting pin 9 located behind the rail 8 in the direction of motion of the scanning device and, after the scanning device has completed its scan over the cylinder, the pin 9 engages the end of the channel-shaped cam track 2 as shown in FIG. 2. The pin engaging the cam track 2 lifts the central pivot 3 of the toggle linkage away from the stop 6 to release the over-center position of the toggle linkage. Further movement of the pin 9 along the cam track 2 lifts the central pivot 3 and moves the support 4 rearwards along the slide 5 until the scanning device reaches the end of its movement. At this point, the support 4 for the journal bearing has been moved sufficiently by the toggle linkage to enable the cylinder to be removed and replaced by a subsequent cylinder to be scanned.

The cam track 2 is arranged so that as the pin 9 initially enters its free end, the force exerted on the central pivot of the toggle linkage has a large vertical component to lift the central pivot upwards and disengage it from its over-center position with a slow acceleration. The central part of the cam track is arranged to provide a rapid acceleration of the lifting movement of the central pivot 3 of the toggle linkage and then finally, the last part of the cam track provides very little further lift of the central pivot. This arrangement ensures that a large torque is available to initially move the central pivot 3 to unlock the toggle linkage and then a smaller torque and a higher acceleration to move the support 4.

We claim:

1. A mechanism for moving a journal bearing support as an operating device travels past said journal bearing support, comprising:
    a toggle linkage connected to said journal bearing support and having a central pivot;
    a cam track connected to said central pivot;
    and a projecting member attached to said device, said projecting member being positioned on said device so as to be engageable with said cam track towards an end of the pass of said device;
    said cam track being curved so that further movement of said device after said projecting member has engaged said cam track causes said central pivot of said toggle linkage to move thereby releasing said central pivot so as to move said journal bearing support as said device completes its pass.

2. The mechanism of claim 1, wherein said toggle linkage is an over-center toggle linkage, said over-center toggle linkage being firmly held into an extended position prior to said central pivot being released.

3. The mechanism of claim 2, wherein said toggle linkage further comprises a telescopic arm connected to said central pivot and means for biasing said telescopic arm into an extended position.

4. The mechanism of claim 3, wherein said cam track has a channel shape.

5. The mechanism of claim 4, wherein said channel-shaped cam track is serpentine-shaped and has two arcs of different radius connected tangentially.

6. The mechanism of claim 5, wherein said cam track is oriented so that said projecting member initially engages said arc having the smallest radius of curvature.

7. The mechanism of claim 1, wherein said cam track and and said pin are shaped in and oriented such that said journal bearing support moves in a direction parallel to a direction of movement of said device as said device completes its pass.

8. The mechanism of claim 1, wherein said operating device also includes a rail positioned in front of said projecting member and being parallel to the direction of movement of said device, said rail further being positioned so as to lie in a path of said central pivot of the toggle linkage when said central pivot is released.

9. A mechanism for moving a journal bearing support as an operating device travels past said journal bearing support, comprising:
    a toggle linkage connected to said journal bearing support and having a central pivot;
    a cam track connected to said central pivot;
    and a projecting member attached to said device, said projecting member being positioned on said device so as to be engageable with said cam track towards an end of the pass of said device;
    said cam track being curved so that further movement of said device after said projecting member has engaged said cam track causes said central pivot of said toggle linkage to move thereby releasing said central pivot so as to move said journal bearing support as said device completes its pass;
    said toggle linkage being an over-center toggle linkage, said over-center toggle linkage being firmly held onto an extended position prior to said central pivot being released;
    said operating device also including a rail positioned in front of said projecting member and being parallel to the direction of movement of said device, said rail further being positioned so as to lie in a path of said center pivot of the toggle linkage when said center pivot is released.

10. A mechanism for moving a journal bearing support as an operating device travels past said journal bearing support, comprising:
    a toggle linkage connected to said journal bearing support and having a central pivot;
    a cam track connected to said central pivot;
    and a projecting member attached to said device, said projecting member being positioned on said device so as to be engageable with said cam track towards an end of the pass of said device;
    said cam track being curved so that further movement of said device after said projection member has engaged said cam track causes said central pivot of said toggle linkage to move thereby releasing said central pivot so as to move said journal bearing support as said device completes its pass;
    said toggle linkage being an over-center toggle linkage, said over-center toggle linkage being firmly held into an extended position prior to said central pivot being released;
    said toggle linkage further comprising a telescopic arm connected to said central pivot and means for biasing said telescopic arm into an extended position;
    said cam track having a channel shape, said channel-shaped cam track being serpentine-shaped and having two arcs of different radius connected tangentially, said cam track being oriented so that said projecting member initially engages said arc having the smallest radius of curvature;
    said operating device also including a rail positioned in front of said projecting member and being parallel to the direction of movement of said device, said rail further being positioned so as to lie in a path of said center pivot of the toggle linkage when said center pivot is released.

* * * * *